United States Patent
Hwang et al.

(10) Patent No.: US 11,161,541 B2
(45) Date of Patent: Nov. 2, 2021

(54) STEERING ANGLE LIMITING DEVICE OF STEER-BY-WIRE SYSTEM

(71) Applicants: Hyundai Motor Company, Seoul (KR); KIA Motors Corporation, Seoul (KR)

(72) Inventors: Sang Woo Hwang, Seoul (KR); Young Dae Park, Chungcheongnam-do (KR); Byung Rim Lee, Gyeonggi-do (KR); Min Jun Kim, Busan (KR); Se Hyun Chang, Gyeonggi-do (KR); Hyeon Seok Cho, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 461 days.

(21) Appl. No.: 16/154,303

(22) Filed: Oct. 8, 2018

(65) Prior Publication Data
US 2019/0389503 A1 Dec. 26, 2019

(30) Foreign Application Priority Data
Jun. 21, 2018 (KR) .................. 10-2018-0071156

(51) Int. Cl.
| | |
|---|---|
| B62D 5/00 | (2006.01) |
| B62D 6/00 | (2006.01) |
| B62D 15/02 | (2006.01) |
| B62D 5/04 | (2006.01) |

(52) U.S. Cl.
CPC .......... B62D 5/006 (2013.01); B62D 5/0469 (2013.01); B62D 6/008 (2013.01); B62D 15/022 (2013.01)

(58) Field of Classification Search
CPC . B62D 6/008; B62D 15/002; Y10T 74/18688; F16M 2200/021; F16M 2200/024
See application file for complete search history.

(56) References Cited

U.S. PATENT DOCUMENTS

| | | | | |
|---|---|---|---|---|
| 3,202,008 | A * | 8/1965 | Geyer | F16H 25/2015 74/89.37 |
| 3,662,610 | A * | 5/1972 | Thoen | G05G 5/04 74/10.2 |
| 5,662,003 | A * | 9/1997 | Ohara | G05G 1/08 74/498 |
| 5,709,281 | A * | 1/1998 | Sherwin | B62D 5/0466 180/272 |

(Continued)

FOREIGN PATENT DOCUMENTS

KR 100421423 3/2004

*Primary Examiner* — Minnah L Seoh
*Assistant Examiner* — Maurice L Williams
(74) *Attorney, Agent, or Firm* — Lempia Summerfield Katz LLC

(57) ABSTRACT

Disclosed herein is a device for selectively limiting both rotational directions of a steering wheel, and provided is a steering angle limiting device of a steer-by-wire (SBW) system including a stopping gear configured to be rotated together with a steering shaft; a cam configured to receive a rotational force of an actuator and to be eccentrically rotated; and a stopper configured to be rotated in response to rotational operation of the cam and selectively engaged with gear teeth of the stopping gear, thereby restricting selectively forward and reverse directional rotations of the stopping gear.

15 Claims, 8 Drawing Sheets

(56) References Cited

U.S. PATENT DOCUMENTS

| | | | | |
|---|---|---|---|---|
| 6,148,951 A * | 11/2000 | Nishi | ............... | B62D 5/0463 180/446 |
| 6,164,150 A * | 12/2000 | Shindo | ............... | B62D 5/008 180/404 |
| 6,212,453 B1 * | 4/2001 | Kawagoe | ............ | B62D 15/025 701/41 |
| 6,219,604 B1 * | 4/2001 | Dilger | ............... | B62D 6/003 180/422 |
| 6,575,263 B2 * | 6/2003 | Hjelsand | ............... | B62D 5/003 180/402 |
| 6,598,695 B1 * | 7/2003 | Menjak | ............... | B62D 5/001 180/402 |
| 6,719,088 B2 * | 4/2004 | Nakano | ............... | B62D 5/008 180/402 |
| 6,736,236 B2 * | 5/2004 | Kurishige | ............ | B62D 5/0466 180/443 |
| 7,034,483 B2 * | 4/2006 | Takahashi | ............ | B62D 5/006 318/139 |
| 7,207,411 B2 * | 4/2007 | Duits | ............... | B62D 5/005 180/402 |
| 7,306,070 B2 * | 12/2007 | Kobayashi | ............ | B62D 5/008 180/403 |
| 7,681,688 B2 * | 3/2010 | Nakatsu | ............... | B62D 5/008 180/444 |
| 8,066,092 B2 * | 11/2011 | Shimizu | ............... | B62D 5/0469 180/444 |
| 8,281,687 B2 * | 10/2012 | Koma | ............... | B62D 15/0215 74/575 |
| 8,459,133 B2 * | 6/2013 | Inoue | ............... | F16H 25/2015 74/89.37 |
| 8,656,798 B2 * | 2/2014 | Kawahara | ............ | F16H 25/20 74/89.32 |
| 9,126,618 B2 * | 9/2015 | Hayama | ............... | B62D 5/001 |
| 9,381,934 B2 * | 7/2016 | Ulrich | ............... | B62D 5/006 |
| 10,895,278 B2 * | 1/2021 | Kim | ............... | B62D 6/10 |

* cited by examiner

[FIG. 1]
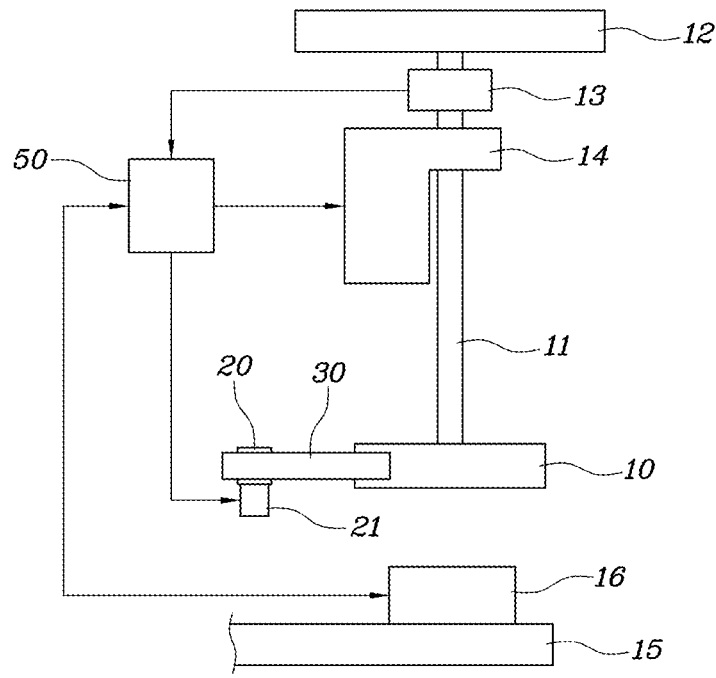
[FIG. 2]
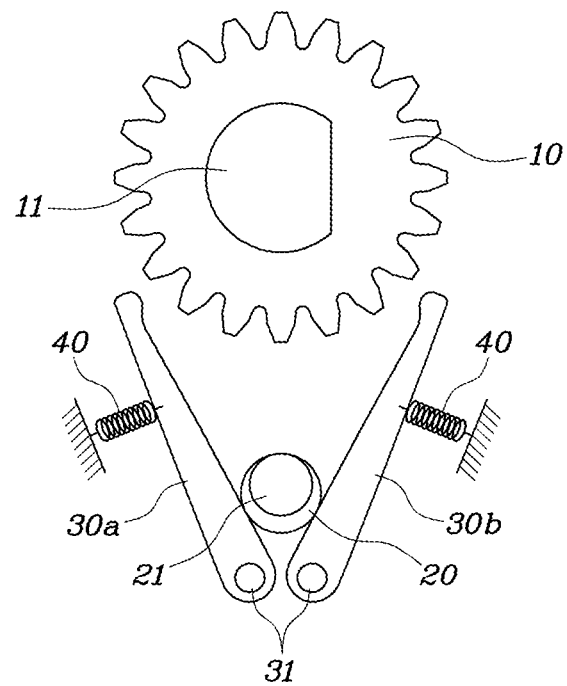

[FIG. 3]
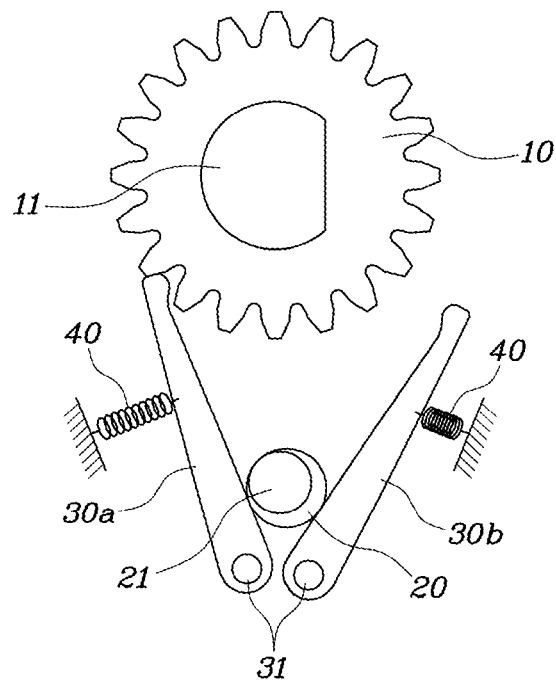
[FIG. 4]
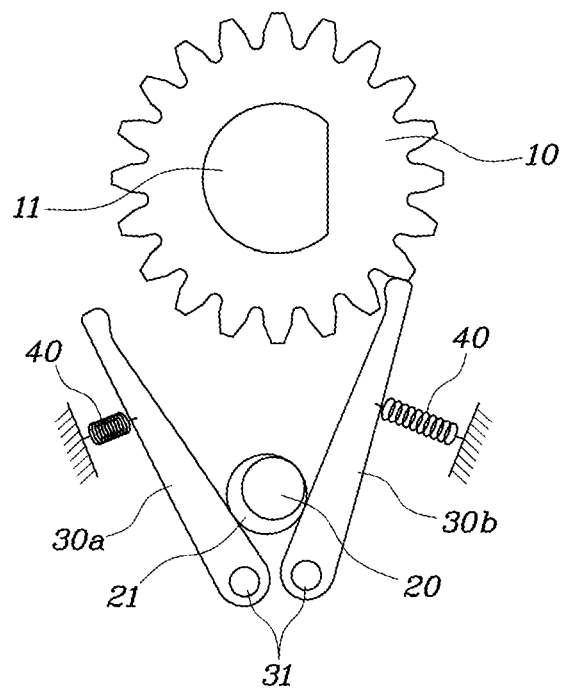

[FIG. 5]
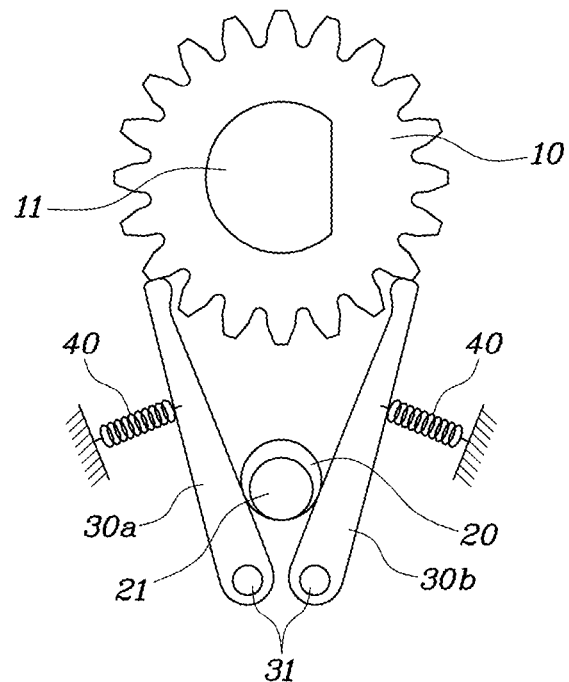
[FIG. 6A]
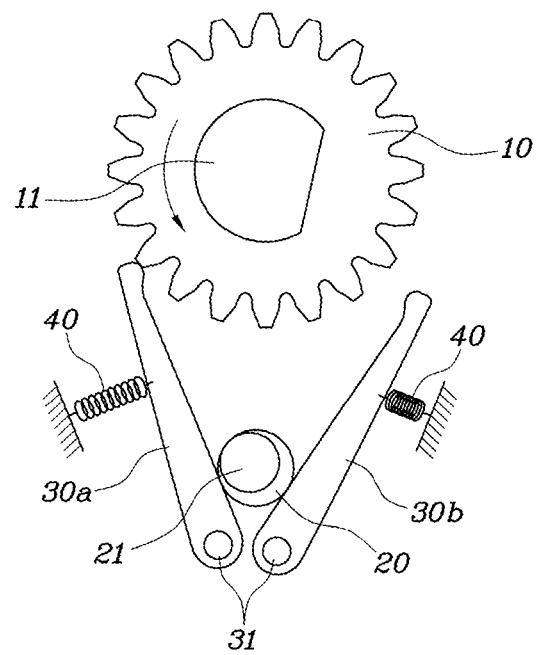

[FIG. 6B]
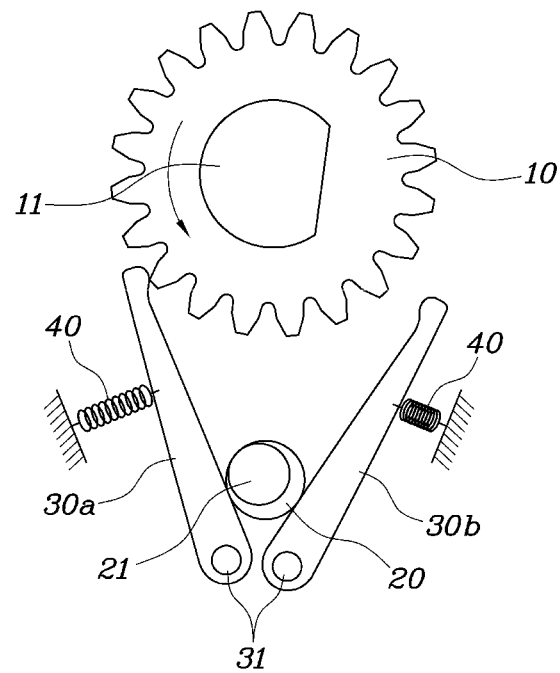
[FIG. 6C]
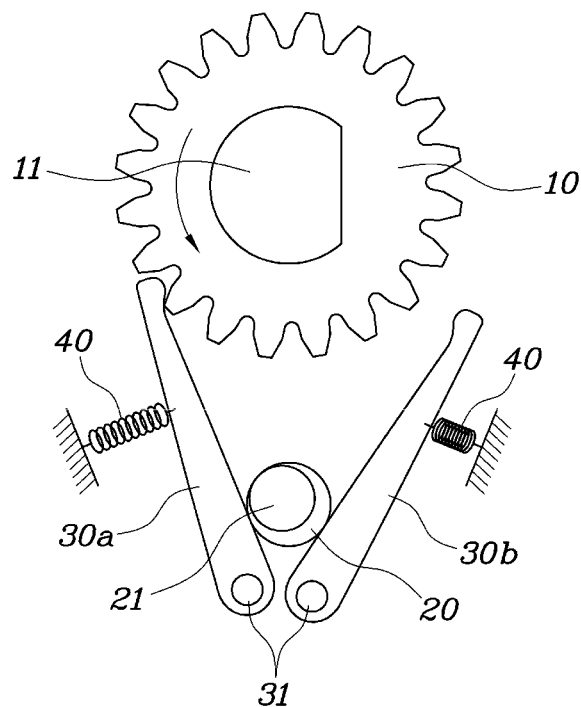

[FIG. 6D]
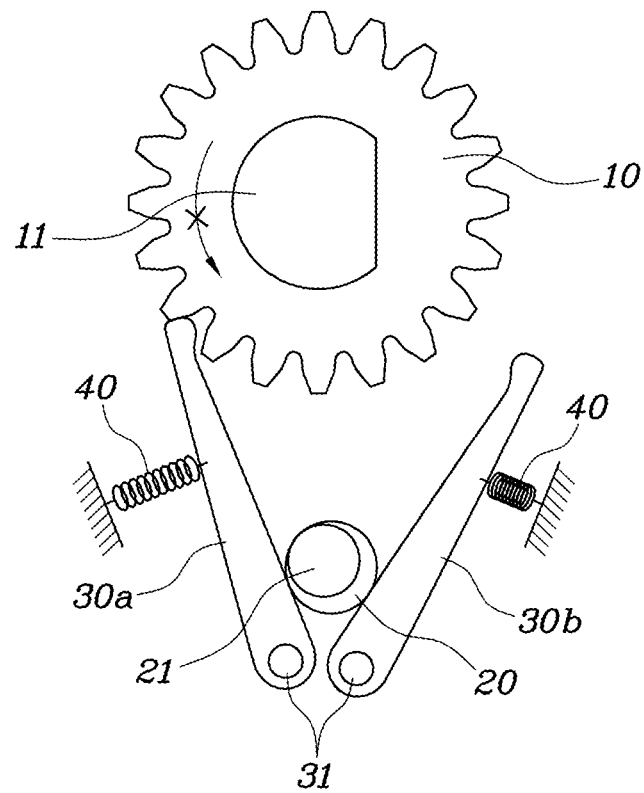
[FIG. 7]
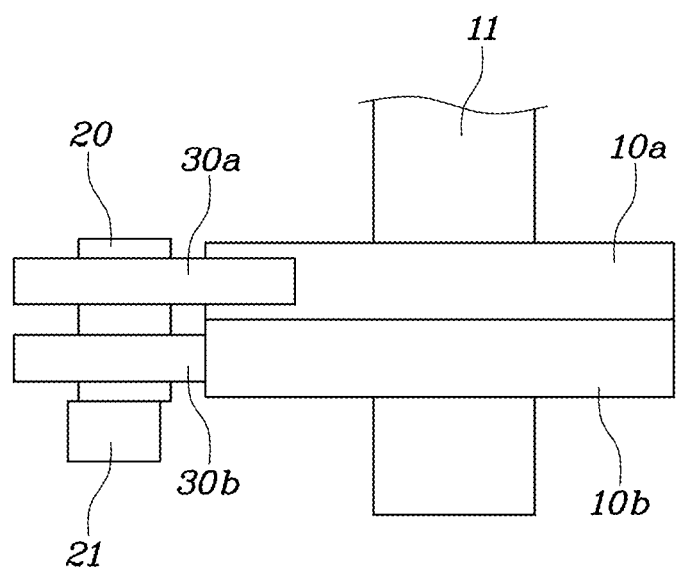

[FIG. 8]
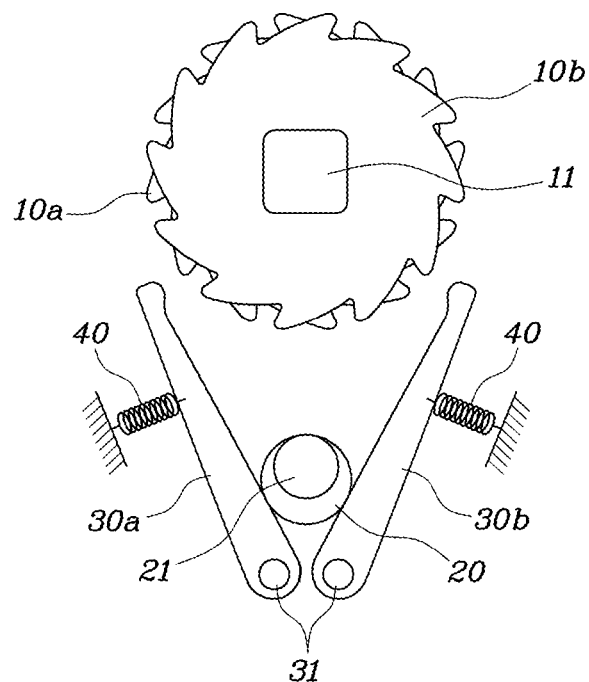
[FIG. 9]
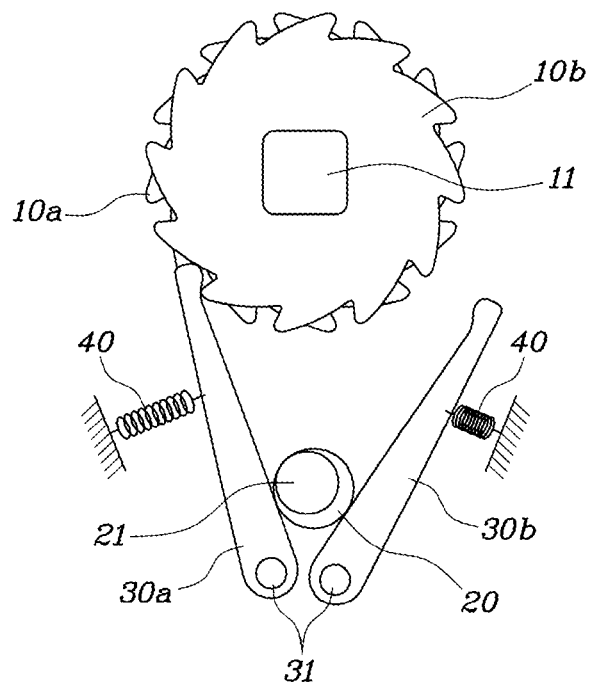

[FIG. 10]
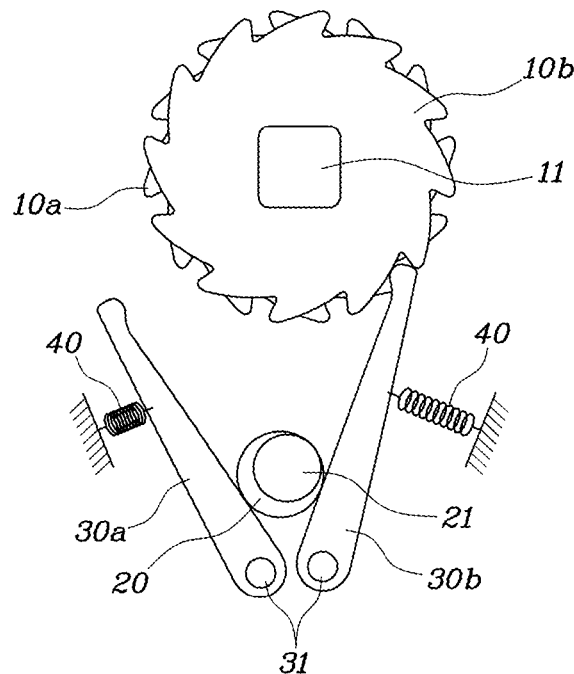
[FIG. 11]
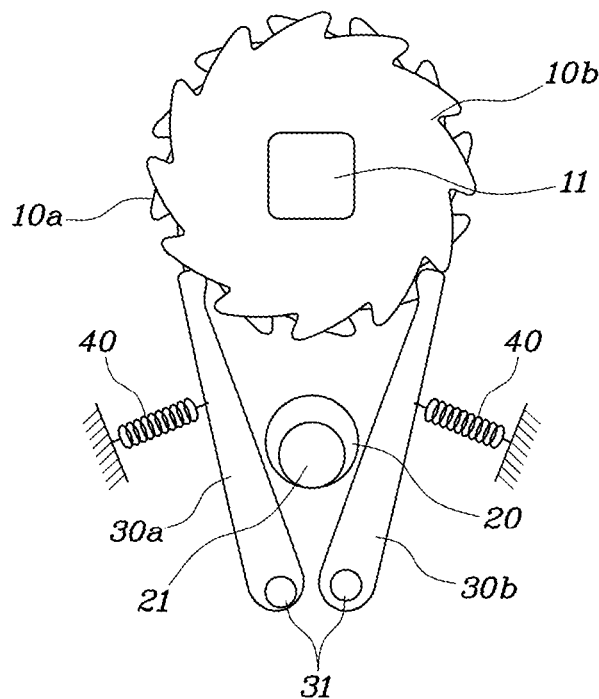

[FIG. 12]
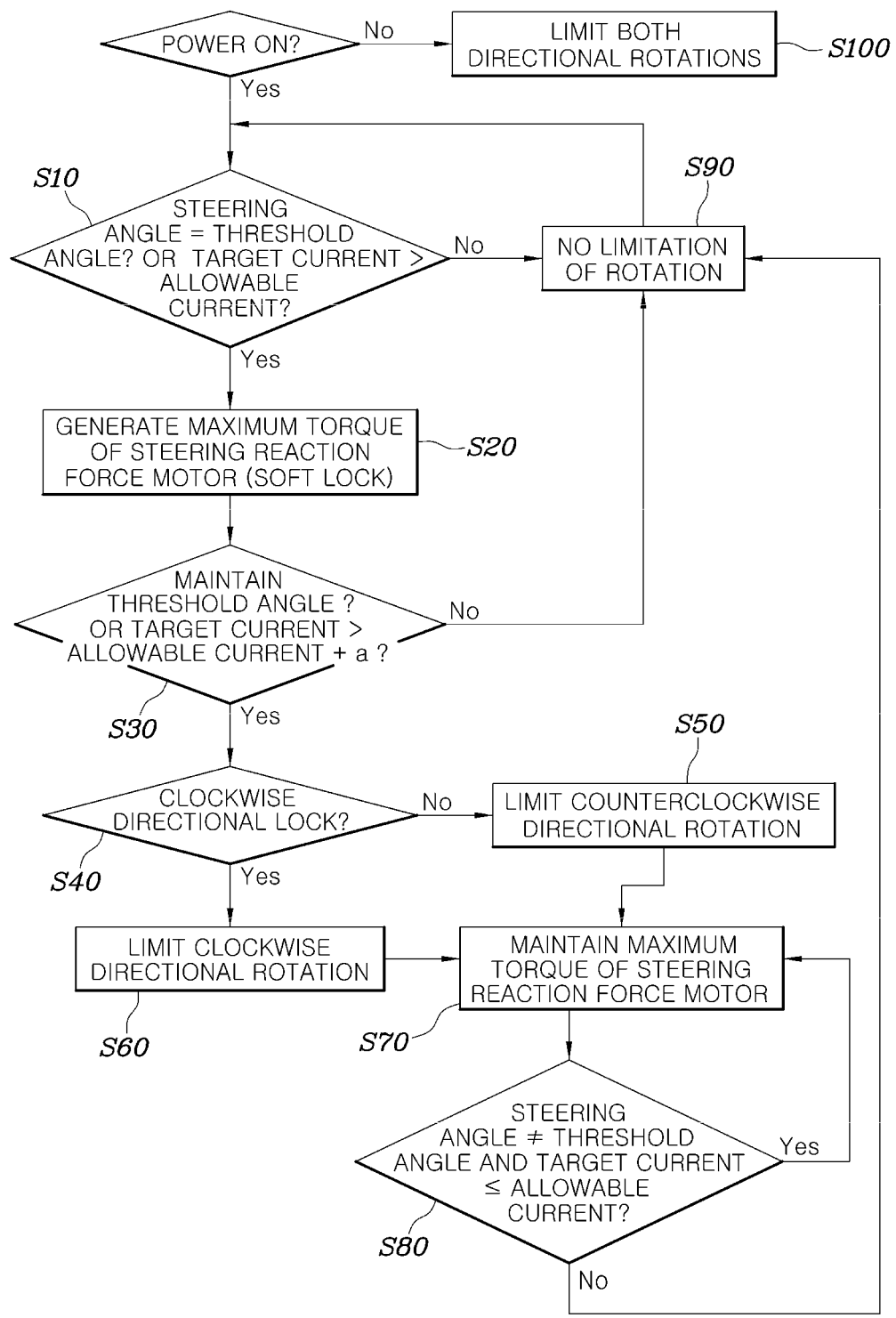

STEERING ANGLE LIMITING DEVICE OF STEER-BY-WIRE SYSTEM

CROSS REFERENCE TO RELATED APPLICATION

The present application claims priority of Korean Patent Application No. 10-2018-0071156 filed on Jun. 21, 2018, the entire contents of which are incorporated herein for all purposes by this reference.

FIELD

The present disclosure relates to a steering device for a vehicle.

BACKGROUND

The statements in this section merely provide background information related to the present disclosure and may not constitute prior art.

A steer-by-wire (SBW) system is a steering system that separates a mechanical connection between a steering wheel and a driving wheel of a vehicle, and this system may receive a rotational signal of the steering wheel through an electronic control unit (ECU) and operate a steering assist motor connected to the driving wheel based on the inputted rotational signal to steer a vehicle.

In a steer-by-wire system, a mechanical connection structure included in an existing steering system is eliminated, allowing more freedom of layout according to the steering system configuration, improving fuel efficiency, and eliminating disturbance which is inversely inputted from a vehicle wheel.

However, due to the elimination of the mechanical connection structure, steering information may not be fed back to the driver as is customary.

In other words, due to the mechanical connection structure using a universal joint and the like, a steering wheel is also restricted by a rotation limit of a tire. However, in the steer-by-wire system, the steering wheel and the tire steering system are mechanically separated from each other, a mechanism for constantly limiting a rotational angle of the steering wheel may be used.

For example, when rotation of the tire is disturbed by an external factor such as a situation where the tire is not steered by being caught on a curb or a sidewalk block, there is a situation where although even if the steering wheel is rotated, the tire is not rotated, and therefore the driver does not recognize the situation. In such a case, a steering input may be continuously provided in a state in which the tire is not rotated, perhaps leading to motor overload or the like.

Accordingly, in order to limit a steering angle, a device for holding a column shaft with a solenoid valve, a magnetro rheological (MR) damper, a brake and the like has been proposed. However, since both directional rotations of the column shaft are limited, the steering wheel may be locked when suddenly and reversely steered.

As another device for limiting the steering angle, there is a device configured to change a rotational angle of a column shaft using a planetary gear and a motor and to limit rotation of the column shaft using a stopper. However, this device has a high complexity, and restricting both directional rotations of the column shaft may not be implemented when a vehicle engine is turned off.

SUMMARY

Further areas of applicability will become apparent from the description provided herein. It should be understood that the description and specific examples are intended for purposes of illustration only and are not intended to limit the scope of the present disclosure.

The present disclosure provides a steering angle limiting device for a steer-by-wire system, which selectively limits both rotational directions of a steering wheel.

A steering angle limiting device of a steer-by-wire (SBW) system according to the present disclosure may include a stopping gear configured to be rotated together with a steering shaft; a cam configured to receive a rotational force of an actuator and to be eccentrically rotated; and a stopper configured to be rotated in response to rotational operation of the cam and selectively engaged with gear teeth of the stopping gear, thereby restricting selectively forward and reverse directional rotations of the stopping gear.

The stopper may be provided with a rotational shaft at one end thereof and the cam may be provided to be in contact with an intermediate portion of the stopper such that, in response to the rotational operation of the cam, the stopper may be rotated about the rotational shaft in a direction in which the other end of the stopper is close to or moved away from the stopping gear, to selectively restrict the rotation of the stopping gear.

The steering angle limiting device may further include a spring configured to provide an elastic force in a rotational direction in which the other end of the stopper approaches the stopping gear.

The stopper may be configured to comprise a first stopper and a second stopper provided at one side and the other side of the cam, respectively; rotational shafts of the first stopper and the second stopper may be positioned in a direction opposite to the stopping gear with respect to the cam; and the other end of the first stopper and the other end of the second stopper may be positioned on one side and the other side of the stopping gear, respectively.

The stopping gear may be shaft-coupled to the steering shaft; the cam may be disposed on a side of the stopping gear; and rotational shafts of the stopping gear, the cam and the stopper may be installed in the same axial direction.

The stopper may be configured to be selectively engaged with the stopping gear according to each of rotation sections of the cam. For example, in a first rotation section of the entire rotation sections of the cam, in which the cam is eccentric towards the rotational shaft, all of the other end of the first stopper and the other end of the second stopper may be disengaged from the stopping gear; in a second rotation section in which the cam is eccentric towards the second stopper, only the other end of the first stopper may be engaged with the stopping gear; in a third rotation section in which the cam is eccentric towards the stopping gear, all of the other end of the first stopper and the other end of the second stopper may be engaged with the stopping gear; and in a fourth rotation section in which the cam is eccentric towards the first stopper, only the other end of the second stopper may be engaged with the stopping gear.

The stopping gear may include a first ratchet stopping gear formed in a ratchet gear shape and configured to be engaged with the other end of the first stopper for restricting reverse directional rotation thereof; and a second ratchet stopping gear formed in a ratchet gear shape and configured to be engaged with the other end of the second stopper for restricting forward directional rotation thereof.

The steering angle limiting device of the SBW system may further include a steering angle sensor configured to detect a steering angle of the steering shaft; a steering reaction force motor configured to provide the steering shaft with a steering reaction force; a steering assist motor configured to provide a rack bar with a steering force; and a controller configured to control operation of the steering reaction force motor or the actuator on the basis of the steering angle and a current value of the steering assist motor for selectively restricting the forward and reverse directional rotations of the steering shaft.

The controller may be configured to generate a maximum torque, or an increased torque, in the steering reaction force motor to limit rotation of the steering shaft when the steering angle reaches a threshold angle corresponding to an extremity of the steering angle or a target current of the steering assist motor exceeds an allowable current.

The controller may judge a rotational direction of the stopping gear to be restricted, when the steering angle is maintained at the threshold angle or the target current of the steering assist motor exceeds the allowable current by a predetermined value after the maximum or preselected torque is generated by the steering reaction force motor; and the controller controls the rotational operation of the cam using the actuator to restrict the forward or reverse directional rotational operation of the stopping gear through the stopper.

When a target restricting direction of the stopping gear is a reverse direction, the controller may control the rotational operation of the cam to engage the first stopper with the stopping gear, but to disengage the second stopper from the stopping gear, thereby restricting only the reverse directional rotation of the stopping gear; and when the target restricting direction of the stopping gear is a forward direction, the controller may control the rotational operation of the cam to engage the second stopper with the stopping gear, but to disengage the first stopper from the stopping gear, thereby restricting only the forward directional rotation of the stopping gear.

The controller may control the steering reaction force motor to maintain the maximum or preselected torque in the process of restricting the rotational operation of the stopping gear through the stopper.

The controller may control the rotational operation of the cam when a vehicle engine is turned-off such that each of the first stopper and the second stopper is engaged with the stopping gear to restrict both the forward and reverse directional rotations of the stopping gear.

DRAWINGS

In order that the disclosure may be well understood, there will now be described various forms thereof, given by way of example, reference being made to the accompanying drawings, in which:

FIG. 1 is a view showing a configuration of a steer-by-wire system in which a steering angle limiting device is installed;

FIG. 2 is a view exemplarily showing a configuration of the steering angle limiting device;

FIG. 3 is a view showing an operating state in which reverse directional rotation of a steering shaft is restricted;

FIG. 4 is a view showing an operating state in which forward directional rotation of the steering shaft is restricted;

FIG. 5 is a view showing an operating state in which both directional rotations of the steering shaft are restricted;

FIGS. 6A to 6D are views for describing an impact reduction operation performed by cooperative control of a steering reaction force motor in a process of restricting reverse directional rotation of the steering shaft;

FIG. 7 is a view exemplarily showing a configuration in which a plurality of stopping gears are installed in the steering angle limiting device;

FIGS. 8 to 11 are views exemplarily showing a configuration of the steering angle limiting device illustrated in FIG. 7 and a state in which rotation of the steering shaft is restricted or allowed; and FIG. 12 is a flow chart for describing a control process for limiting a steering angle.

The drawings described herein are for illustration purposes only and are not intended to limit the scope of the present disclosure in any way.

DESCRIPTION

The following description is merely exemplary in nature and is not intended to limit the present disclosure, application, or uses. It should be understood that throughout the drawings, corresponding reference numerals indicate like or corresponding parts and features.

The present disclosure is not limited the matter disclosed below and will be understood in different forms which differ from each other. The examples provided merely make the disclosure complete and provide for fully informing the scope to those skilled in the art. In the drawings, like reference numerals refer to like elements.

A steering angle limiting device of a steer-by-wire (SBW) system according to the present disclosure will be described below with reference to the accompanying drawings.

A steering angle limiting device of a SBW system may include a stopping gear 10, a cam 20 and a stopper 30.

With reference to FIG. 1, the stopping gear 10 is configured to be rotated together with a steering shaft 11, and for example, the stopping gear 10 is inserted into and coupled to the steering shaft 11, so that the stopping gear is rotated together with the steering shaft 11 into a restricted state.

The steering shaft 11 may be a column shaft which is rotated together with a steering wheel 12.

The cam 20 is an element which is eccentrically rotated by a rotational force provided from an actuator 21, and this cam may be provided beside the stopping gear 10.

In addition, as rotated in response to rotational operation of the cam 20, the stopper 30 is selectively engaged with gear teeth of the stopping gear 10 to selectively restrict forward and reverse directional rotations of the stopping gear 10.

The above described stopper 30 is elongated in a longitudinal direction and is provided with a rotational shaft 31 at one end thereof, and the cam 20 is provided to be in contact with an intermediate portion of the stopper 30. Due to this configuration, in response to the rotational operation of the cam 20, the stopper 30 is rotationally operated about the rotational shaft 31 in a direction in which the other end of the stopper is close to or moved away from the stopping gear 10, thereby selectively restricting the rotation of the stopping gear 10.

A configuration of the stopper 30 is more specifically described as follows. The stopper 30 includes a first stopper 30a provided on one side of the cam 20 and a second stopper 30b provided on the other side of the cam 20.

The rotational shaft 31 of the first stopper 30a and the rotational shaft 31 of the second stopper 30b are positioned in a direction opposite to the stopping gear 10 with respect to the cam 20, and the other end of the first stopper 30a and the other end of the second stopper 30b are positioned on one side and the other side of the stopping gear 10, respectively.

The rotational shaft 31 of the first stopper 30a and the rotational shaft 31 of the second stopper 30b may be separately installed, and may be installed in the same axial direction as the stopping gear 10 and the cam 20.

In other words, when the cam 20 is eccentrically rotated to the right as shown in FIG. 3, the other end of the first stopper 30a on the left side is engaged with the gear teeth of the stopping gear 10, so that the reverse directional (counterclockwise directional) rotation of the stopping gear 10 is limited, thereby limiting reverse directional turn of the steering wheel 12. However, in this case, the forward directional rotation of the stopping gear 10 is allowed, so that it is possible to rotate the steering wheel 12 in a forward direction when a driver suddenly steers in the forward direction.

Similarly, when the cam 20 is eccentrically rotated to the left side as shown in FIG. 4, the other end of the second stopper 30b on the right side is engaged with the gear teeth of the stopping gear 10, so that the forward directional (clockwise directional) rotation of the stopping gear 10 is limited, thereby limiting forward directional turn of the steering wheel 12. However, in this case, the reverse directional rotation of the stopping gear 10 is allowed, so that it is possible to rotate the steering wheel 12 in a reverse direction when a driver suddenly steers in the reverse direction.

Accordingly, the forward and reverse rotational directions of the steering shaft 11 may be restricted using the plurality of stoppers 30 provided outside the stopping gear 10. In particular, in a state in which the rotation of the steering shaft 11 in a specific direction is restricted, rotation in a direction opposite to the above direction is allowed, so that even when a driver suddenly and reversely steers, the steering wheel 12 may be rotated. As a result, a locking phenomenon of the steering wheel 12 may not occur.

In addition, the device may further include a spring 40 providing an elastic force in a rotational direction in which the other end of the stopper 30 approaches the stopping gear 10.

For example, the springs 40 are provided between the first stopper 30a and a vehicle body and between the second stopper 30b and the vehicle body, respectively. Due to the above configuration, when the cam 20 is eccentrically rotated, the other end of the stopper 30 is pushed towards the stopping gear 10 by a tensile force of the spring 40, the other end of the stopper 30 separated from the stopping gear 10 is therefore engaged with the stopping gear 10 to restrict one directional rotation of the stopping gear 10.

As described above, the device may be configured to allow the stopper 30 to be selectively engaged with the stopping gear 10 according to each of rotation sections of the cam 20.

For example, in a first rotation section of the entire rotation sections of the cam 20, in which the cam 20 is eccentric towards the rotational shaft 31 as shown in FIG. 2, all of the other end of the first stopper 30a and the other end of the second stopper 30b are disengaged from the stopping gear 100, so that the stopping gear 10 are freely rotated in the clockwise and counterclockwise directions to allow the steering wheel 12 to be turned in both right and left directions.

In addition, in a second rotation section in which the cam 20 is eccentric towards the second stopper 30b and that continues to the first rotation section, as shown in FIG. 3, only the other end of the first stopper 30a is engaged with the stopping gear 100, so that counterclockwise directional rotation of the stopping gear 10 is limited and clockwise directional rotation is allowed to limit left turn of the steering wheel 12.

Furthermore, in a third rotation section in which the cam 20 is eccentric towards the stopping gear 10 and that continues to the second rotation section, as shown in FIG. 5, all of the other end of the first stopper 30a and the other end of the second stopper 30b are engaged with the stopping gear 100, so that both the clockwise and counterclockwise directional rotations of the stopping gear 10 are limited to limit all of left turn and right turn of the steering wheel 12.

In addition, in a fourth rotation section in which the cam 20 is eccentric towards the first stopper 30a and that is disposed between and continues to the first rotation section and the third rotation section, as shown in FIG. 4, only the other end of the second stopper 30b is engaged with the stopping gear 100, so that the clockwise directional rotation of the stopping gear 10 is limited and the counterclockwise directional rotation is allowed to limit right turn of the steering wheel 12.

Although the stopping gear 10 is formed in a conventional gear shape and one stopping gear may be provided as shown in FIG. 2, the stopping gear may be configured to include, as another example, two gears formed in a ratchet gear shape as shown in FIGS. 7 to 11.

The stopping gear is described with reference to the accompanying drawings. The stopping gear 10 includes a first ratchet stopping gear 10a formed in a ratchet gear shape and configured to be engaged with the other end of the first stopper 30a for restricting reverse directional rotation thereof and a second ratchet stopping gear 10b formed in a ratchet gear shape and configured to be engaged with the other end of the second stopper 30b for restricting forward directional rotation thereof.

In other words, when the cam 20 is eccentric toward the rotational shaft 31 as shown in FIG. 8, the other end of the first stopper 30a and the other end of the second stopper 30b are disengaged from the first ratchet stopping gear 10a and the second ratchet stopping gear 10b, respectively, so that the stopping gear may be freely rotated in the clockwise and counterclockwise directions.

However, when the cam 20 is eccentric towards the second stopper 30b as shown in FIG. 9, the other end of the first stopper 30a is engaged with the first ratchet stopping gear 10a, so that the counterclockwise directional rotation of the stopping gear is restricted and the clockwise directional rotation is allowed.

In addition, when the cam 20 is eccentric towards the first stopper 30a as shown in FIG. 10, the other end of the second stopper 30b is engaged with the second ratchet stopping gear 10b, so that the clockwise directional rotation of the stopping gear is restricted and the counterclockwise directional rotation is allowed.

Furthermore, when the cam 20 is eccentric toward the stopping gear as shown in FIG. 11, the other end of the first stopper 30a and the other end of the second stopper 30b are engaged with the first ratchet stopping gear 10a and the second ratchet stopping gear 10b, respectively, so that all the clockwise and counterclockwise directional rotations of the stopping gear are limited to limit rotation of the steering wheel 12.

The device may be configured to control operation of the actuator 21 and a steering reaction force motor 14 through a controller 50 to limit the steering angle. To this end, the device may include a steering angle sensor 13, the steering reaction force motor 14, a steering assist motor 16 and the controller 50.

Referring to FIGS. 1 and 12, the steering angle sensor 13 may be provided on the steering shaft 11 to detect the steering angle of the steering shaft 11, the steering reaction force motor 14 is installed to provide the steering shaft 11 with a steering reaction force, and the steering assist motor 16 is installed to provide a rack bar 15 with a steering force.

In addition, current values of the steering angle sensor 13 and the steering assist motor 16 are inputted through the controller 50, and operation of the steering reaction force motor 14 or the actuator 21 is controlled on the basis of the inputted steering angle and current value of the steering assist motor 16 to selectively restrict the forward and reverse directional rotations of the steering shaft 11.

For example, the controller 50 is configured to generate maximum or preselected torque in the steering reaction force motor 14 to limit the rotation of the steering shaft 11 when the steering angle reaches a threshold angle corresponding to an extremity of the steering angle or a target current of the steering assist motor 16 exceeds an allowable current.

That is, when it is judged that the steering wheel 12 is fully turned in any one direction and reaches an extremity of the steering angle, or when only the target current of the steering assist motor 16 exceeds the allowable current and is increased due to a situation in which a tire is in contact with a curb and a tire steering angle cannot be increased any more, the maximum current, or a preselected increased current, which may be output through the steering reaction force motor 14, is generated to limit the rotation of the steering shaft 11 (soft lock).

In addition, when the steering angle is maintained at the threshold angle or the target current of the steering assist motor 16 exceeds the allowable current by a predetermined value after the maximum or preselected increased torque is generated by the steering reaction force motor 14, the controller 50 judges a rotational direction of the stopping gear 10 to be restricted.

Furthermore, the controller may control the rotational operation of the cam 20 using the actuator 21 to restrict the forward or reverse directional rotational operation of the stopping gear 10 through the stopper.

Specifically, when a target restricting direction of the stopping gear 10 is a reverse direction, the controller controls the rotational operation of the cam 20 to engage the first stopper 30a with the stopping gear 10, but to disengage the second stopper 30b from the stopping gear 10, thereby restricting only the reverse directional rotation of the stopping gear 10.

In addition, when the target restricting direction of the stopping gear 10 is a forward direction, the controller controls the rotational operation of the cam 20 to engage the second stopper 30b with the stopping gear 10, but to disengage the first stopper 30a from the stopping gear 10, thereby restricting only the forward directional rotation of the stopping gear 10.

That is, after implementing the soft lock in which the rotation of the steering shaft 11 is preferentially limited by the steering reaction force motor 14, when the extremity state of the steering angle is maintained intact or the target current of the steering assist motor 16 is further increased, the left turn or right turn of the steering wheel 12 is limited by limiting the forward directional or reverse directional rotation of the stopping gear 10 through the rotational operation of the first stopper 30a or of the second stopper 30b.

The controller 50 may control the steering reaction force motor 14 to maintain the maximum or preselected increased torque in the process of restricting the rotational operation of the stopping gear 10 through the stopper 30.

That is, when a hard lock in which the rotation of the stopping gear 10 is limited by using the stopper 30 is being operated, an end portion of the stopper 30 may not be correctly engaged with the gear teeth of the stopping gear 10 as shown in FIG. 6A.

In this case, when the operation of the soft lock in which the rotation of the steering shaft 11 is limited by operation of the steering reaction force motor 14 is maintained, the rotation of the stopping gear 10 is slowly performed in the order shown in FIGS. 6A to 6D, and thus it is possible to reduce an occurrence of impact and noise generated when the stopper 30 is bumped against the gear teeth of the stopping gear 10.

By increasing the number of the gear teeth of the stopping gear 10, it is possible to further reducing the impact.

In addition, when a vehicle engine is turned off, the controller 50 controls the rotational operation of the cam 20 to engage each of the first stopper 30a and the second stopper 30b with the stopping gear 10, so that it is possible to restrict both the forward and reverse directional rotations of the stopping gear 10.

In other words, in the state in which the vehicle engine is turned off, a locking function for the steering wheel 12 may be desired. By operating the cam 20, all the other end of the first stopper 30a and the other end of the second stopper 30b are engaged with the stopping gear as shown in FIG. 5, and thus the locking function for the steering wheel 12 can be realized.

Meanwhile, a process for limiting the steering angle of the steering wheel 12 using the steering angle limiting device of the SBW system is described with reference to FIG. 12. First, in the state in which the vehicle engine is turned off, all the first stopper 30a and the second stopper 30b are engaged with the stopping gear 10 as shown in FIG. 5 to make the stopping gear 10 be in a state where both directional rotations thereof are limited (S100).

However, when power in the vehicle is turned-on, by using the steering angle and the target current of the steering assist motor 16, it is judged whether a current situation is a situation in which the soft lock operation of the steering angle is desired (S10).

As a result of the judgement in the step of S10, if the steering angle reaches the threshold angle or the target current exceeds the allowable current, the maximum torque, or an increased torque, of the steering reaction force motor 14 is generated to limit the rotation of the steering shaft 11 (S20).

Subsequently, by using the steering angle and the target current, it is judged whether a current situation is a situation in which the hard lock operation of the steering angle is desired (S30).

That is, if the steering angle is maintained at the threshold angle for a predetermined time or the target current exceeds the current value higher than the allowable current by a predetermined value, it is judged that the current situation is a situation in which the hard lock operation of the steering angle is desired, and thus the rotational direction in which the hard lock operation is desired is judged (S40).

As a result of the judgement in the step of S40, if a rotation limitation for the counterclockwise direction of the stopping stopper 10 is desired, the cam 20 is eccentrically rotated to engage the first stopper 30a with the gear teeth of the stopping gear 10 as shown in FIG. 2, thereby restricting the counterclockwise directional rotation of the steering wheel 12 (S50).

As a result of the judgement in the step of S40, in addition, if a rotation limitation for the clockwise direction of the stopping stopper 10 is desired, the cam 20 is eccentrically rotated to engage the second stopper 30b with the gear teeth of the stopping gear 10 as shown in FIG. 3, thereby restricting the clockwise directional rotation of the steering wheel 12 (S60).

Particularly, in the process of limiting the rotation of the stopping gear 10 in the steps of S50 and S60, by maintaining a torque of the steering reaction force motor 14 to the maximum or preselected increased torque, the impact and noise generated when the stopper 30 is bumped against the gear teeth of the stopping gear 10 is reduced (S70).

Subsequently, when the steering angle is deviated from the threshold angle and the target current is fallen below the allowable current (S80), the cam 20 is eccentrically rotated to disengage both the first stopper 30a and the second stopper 30b from the gear teeth of the stopping gear 10 as shown in FIG. 2, and thus both directional rotations of the steering wheel are allowed (S90).

As described above, the disclosed device selectively restricts the rotation of the stopping gear 10, which is restricted by the steering shaft 11, according to a change in the rotational angle of the cam 20 caused by control of the actuator 21, the stopping gear is therefore selectively limited with respect to only the rotational direction to be limited. Therefore, in the state in which the rotation of the stopping gear 10 in one direction is limited, it is possible to rotate the steering wheel 12 when a driver suddenly and reversely operates the steering wheel 12, whereby the reverse rotation locking phenomenon of the steering wheel 12 is eliminated.

In addition, it is possible to implement a locking function, which restricts both directional rotations of the steering wheel, without adding an additional configuration or supplying power in a state in which a vehicle engine is turned off.

The above-described device selectively restricts rotation of the stopping gear restricted by the steering shaft according to a change in the rotational angle of the cam caused by control of the actuator to limit the stopping gear only in the rotational direction to be limited. Therefore, the steering wheel may be rotationally operated without the lock phenomenon of the steering wheel when the steering wheel is suddenly and reversely operated and there is also an effect of implementing a locking function, which restricts both directional rotations of the steering wheel, without adding an additional configuration or supplying power in a state in which a vehicle engine is turned off.

Those skilled in the art will appreciate that various modifications, additions and substitutions are possible, without departing from the scope and spirit of the disclosure in the accompanying claims.

What is claimed is:

1. A steering angle limiting device of a steer-by-wire (SBW) system, comprising:
    a stopping gear configured to be rotated together with a steering shaft;
    a cam configured to receive a rotational force of an actuator and to be eccentrically rotated; and
    a stopper configured to be rotated in response to rotational operation of the cam and selectively engaged with gear teeth of the stopping gear, thereby restricting selectively forward and reverse directional rotations of the stopping gear,
    wherein the stopper is provided with a rotational shaft at a first end thereof and the cam is provided to be in contact with an intermediate portion of the stopper such that, in response to the rotational operation of the cam, the stopper is rotated about the rotational shaft in a direction in which a second end of the stopper is close to or moved away from the stopping gear, to selectively restrict the rotation of the stopping gear.

2. The steering angle limiting device of the SBW system according to claim 1, further comprising a spring configured to provide an elastic force in a rotational direction in which the other end of the stopper approaches the stopping gear.

3. The steering angle limiting device of the SBW system according to claim 1, wherein the stopper is configured to comprise a first stopper and a second stopper provided at one side and the other side of the cam, respectively; rotational shafts of the first stopper and the second stopper are positioned in a direction opposite to the stopping gear with respect to the cam; and the other end of the first stopper and the other end of the second stopper are positioned on one side and the other side of the stopping gear, respectively.

4. The steering angle limiting device of the SBW system according to claim 3, wherein the stopping gear is shaft-coupled to the steering shaft; the cam is disposed on a side of the stopping gear; and rotational shafts of the stopping gear, the cam and the stopper are installed in the same axial direction.

5. The steering angle limiting device of the SBW system according to claim 3, wherein the stopper is configured to be selectively engaged with the stopping gear according to each of rotation sections of the cam;
    in a first rotation section of the entire rotation sections of the cam, in which the cam is eccentric towards the rotational shaft, all of the other end of the first stopper and the other end of the second stopper are disengaged from the stopping gear;
    in a second rotation section in which the cam is eccentric towards the second stopper, only the other end of the first stopper is engaged with the stopping gear;
    in a third rotation section in which the cam is eccentric towards the stopping gear, all of the other end of the first stopper and the other end of the second stopper are engaged with the stopping gear; and
    in a fourth rotation section in which the cam is eccentric towards the first stopper, only the other end of the second stopper is engaged with the stopping gear.

6. The steering angle limiting device of the SBW system according to claim 3, wherein the stopping gear comprises
    a first ratchet stopping gear formed in a ratchet gear shape and configured to be engaged with the other end of the first stopper for restricting reverse directional rotation thereof; and
    a second ratchet stopping gear formed in a ratchet gear shape and configured to be engaged with the other end of the second stopper for restricting forward directional rotation thereof.

7. The steering angle limiting device of the SBW system according to claim 1, further comprising;
    a steering angle sensor configured to detect a steering angle of the steering shaft;
    a steering reaction force motor configured to provide the steering shaft with a steering reaction force;
    a steering assist motor configured to provide a rack bar with a steering force; and
    a controller configured to control operation of the steering reaction force motor or the actuator on the basis of the steering angle and a current value of the steering assist motor for selectively restricting the forward and reverse directional rotations of the steering shaft.

8. The steering angle limiting device of the SBW system according to claim 7, wherein the controller is configured to generate a preselected increased torque in the steering reaction force motor to limit rotation of the steering shaft when the steering angle reaches a threshold angle corresponding to an extremity of the steering angle or a target current of the steering assist motor exceeds an allowable current.

9. The steering angle limiting device of the SBW system according to claim 8, wherein the controller judges a rotational direction of the stopping gear to be restricted, when the steering angle is maintained at the threshold angle or the target current of the steering assist motor exceeds the allowable current by a predetermined value after the preselected increased torque is generated by the steering reaction force motor; and the controller controls the rotational operation of the cam using the actuator to restrict the forward or reverse directional rotational operation of the stopping gear through the stopper.

10. The steering angle limiting device of the SBW system according to claim 9, wherein,
   the stopper is configured to comprise a first stopper and a second stopper;
   when a target restricting direction of the stopping gear is a reverse direction, the controller controls the rotational operation of the cam to engage a first stopper with the stopping gear, but to disengage a second stopper from the stopping gear, thereby restricting only the reverse directional rotation of the stopping gear; and
   when the target restricting direction of the stopping gear is a forward direction, the controller controls the rotational operation of the cam to engage the second stopper with the stopping gear, but to disengage the first stopper from the stopping gear, thereby restricting only the forward directional rotation of the stopping gear.

11. The steering angle limiting device of the SBW system according to claim 9, wherein the controller is configured to control the steering reaction force motor to maintain the preselected increased torque in the process of restricting the rotational operation of the stopping gear through the stopper.

12. The steering angle limiting device of the SBW system according to claim 11, wherein the preselected increased torque is a maximum torque.

13. The steering angle limiting device of the SBW system according to claim 9, wherein the preselected increased torque is a maximum torque.

14. The steering angle limiting device of the SBW system according to claim 8, wherein the preselected increased torque is a maximum torque.

15. The steering angle limiting device of the SBW system according to claim 7, wherein the stopper is configured to comprise a first stopper and a second stopper, and the controller is configured to control the rotational operation of the cam when a vehicle engine is turned-off such that each of a first stopper and a second stopper is engaged with the stopping gear to restrict both the forward and reverse directional rotations of the stopping gear.

* * * * *